US012610347B2

(12) United States Patent　　　　(10) Patent No.:　US 12,610,347 B2
Glenn et al.　　　　　　　　　　　(45) Date of Patent:　　Apr. 21, 2026

(54) ESCALATED AND PERSISTENT MESSAGES FOR NETWORK SERVICE ACCESS BY SUBSCRIBER DEVICES OF A WIRELESS TELECOMMUNICATION NETWORK

(71) Applicant: T-Mobile USA, Inc., Bellevue, WA (US)

(72) Inventors: Peter Jonathan Glenn, Bonney Lake, WA (US); Rohit Iyer, Renton, WA (US); Santosh Ashok Javali, Marysville, WA (US); Sean Harrison Roach, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 421 days.

(21) Appl. No.: 18/312,830

(22) Filed: May 5, 2023

(65) Prior Publication Data

US 2024/0373404 A1　　Nov. 7, 2024

(51) Int. Cl.
　　*H04W 68/06*　　(2009.01)
　　*H04L 67/55*　　(2022.01)
　　*H04W 68/08*　　(2009.01)
(52) U.S. Cl.
　　CPC ............. *H04W 68/06* (2013.01); *H04L 67/55* (2022.05); *H04W 68/08* (2013.01)
(58) Field of Classification Search
　　CPC ..... H04W 68/00; H04W 68/06; H04W 68/08; H04L 12/1895; H04L 67/55
　　See application file for complete search history.

(56) References Cited

U.S. PATENT DOCUMENTS

| | | | |
|---|---|---|---|
| 6,353,740 B1 | 3/2002 | Granberg |
| 6,505,051 B1 | 1/2003 | Alperovich et al. |
| 6,922,465 B1 | 7/2005 | Howe |
| 6,990,330 B2 | 1/2006 | Veerepalli et al. |
| 7,039,164 B1 | 5/2006 | Howe |

(Continued)

FOREIGN PATENT DOCUMENTS

| | | |
|---|---|---|
| CN | 107750440 A | 3/2018 |
| DE | 102007049025 A1 | 5/2009 |

(Continued)

*Primary Examiner* — Jeong S Park
(74) *Attorney, Agent, or Firm* — Perkins Coie LLP

(57)　　　　　ABSTRACT

A wireless telecommunication network is configured to provide enhanced subscriber messaging to subscriber devices related to predicted changes to network service access. Network service changes are predicted based on events that are published in a network event queue, with certain events indicating a failure of a subscriber to meet service subscription requirements. A notification subsystem of the wireless telecommunication network, in response to detecting the certain events, causes notifications to be displayed on multiple subscriber devices of the subscriber. The display of notifications on subscriber devices is remotely controlled by the notification subsystem. For example, the notifications are persistently displayed irrespective of user input until a specific command to dismiss the notifications is transmitted by the notification subsystem. The notifications can also be dynamically escalated based on proximity to the predicted network service change. For example, an escalated notification can occupy a maximum display area on a subscriber device.

20 Claims, 8 Drawing Sheets

(56) References Cited

U.S. PATENT DOCUMENTS

| | | | |
|---|---|---|---|
| 7,107,039 B2 | 9/2006 | Liao et al. | |
| 7,194,249 B2 | 3/2007 | Phillips et al. | |
| 7,215,754 B1 | 5/2007 | Woodson et al. | |
| 7,266,371 B1 | 9/2007 | Amin et al. | |
| 7,333,810 B2 | 2/2008 | Preiss et al. | |
| 7,483,698 B2 | 1/2009 | Hurtta | |
| 7,657,253 B2 | 2/2010 | Lewis | |
| 7,996,481 B2 | 8/2011 | Stillman et al. | |
| 8,005,112 B2 | 8/2011 | Agmon et al. | |
| 8,089,503 B2 | 1/2012 | Bruce et al. | |
| 8,126,479 B2 | 2/2012 | Morrison | |
| 8,126,480 B2 | 2/2012 | Morrison | |
| 8,194,581 B1 | 6/2012 | Schroeder et al. | |
| 8,234,676 B2 | 7/2012 | Klein et al. | |
| 8,271,039 B2 | 9/2012 | Capuozzo et al. | |
| 8,493,970 B2 | 7/2013 | Strieter et al. | |
| 8,751,652 B2 | 6/2014 | Kuure et al. | |
| 8,804,695 B2 | 8/2014 | Branam | |
| 8,914,051 B2 | 12/2014 | Daly et al. | |
| 9,398,491 B2 | 7/2016 | Schwarz | |
| 9,769,730 B1 | 9/2017 | Hua et al. | |
| 9,826,453 B2 | 11/2017 | Linkola et al. | |
| 9,961,163 B2 | 5/2018 | Pastor Perales et al. | |
| 10,091,658 B2 | 10/2018 | Zhang et al. | |
| 10,666,750 B2 | 5/2020 | Nanavati et al. | |
| 10,680,889 B2 | 6/2020 | Vasseur et al. | |
| 10,715,996 B1 | 7/2020 | Singh et al. | |
| 10,798,560 B2 | 10/2020 | Chennupati et al. | |
| 10,798,645 B2 | 10/2020 | Gandhewar et al. | |
| 11,089,469 B2 | 8/2021 | Bachmutsky et al. | |
| 11,138,861 B2 * | 10/2021 | Blatt | A61B 5/00 |
| 11,153,397 B2 | 10/2021 | Nanavati et al. | |
| 11,197,260 B2 | 12/2021 | Balla et al. | |
| 11,424,993 B1 | 8/2022 | Chaoji et al. | |
| 12,184,509 B2 * | 12/2024 | Shori | H04L 41/16 |
| 2001/0044840 A1 * | 11/2001 | Carleton | H04L 41/0663 |
| | | | 709/223 |
| 2003/0137976 A1 | 7/2003 | Zhu et al. | |
| 2004/0208296 A1 | 10/2004 | Aboujaoude et al. | |
| 2005/0143086 A1 | 6/2005 | Schwarz | |
| 2006/0285691 A1 | 12/2006 | Chin et al. | |
| 2007/0103317 A1 | 5/2007 | Zellner et al. | |
| 2007/0118608 A1 | 5/2007 | Egli | |
| 2007/0209054 A1 | 9/2007 | Cassanova | |
| 2009/0228566 A1 * | 9/2009 | Sharp | H04L 51/224 |
| | | | 709/227 |
| 2012/0051235 A1 | 3/2012 | Kotecha et al. | |
| 2012/0084152 A1 | 4/2012 | Highbaugh et al. | |
| 2012/0123870 A1 | 5/2012 | Denman et al. | |
| 2012/0203602 A1 | 8/2012 | Walters | |
| 2012/0280813 A1 | 11/2012 | Ahluwalia et al. | |
| 2012/0311045 A1 | 12/2012 | Sylvain | |
| 2014/0187242 A1 | 7/2014 | Zhang | |
| 2015/0189044 A1 * | 7/2015 | Pastor Perales | H04L 67/55 |
| | | | 709/217 |
| 2016/0164926 A1 | 6/2016 | Zehavi et al. | |
| 2016/0282132 A1 * | 9/2016 | Bostick | G08G 1/096838 |
| 2018/0212837 A1 | 7/2018 | Kalluri et al. | |
| 2020/0201735 A1 * | 6/2020 | Livoti | G06F 11/0748 |
| 2020/0322662 A1 | 10/2020 | Korte et al. | |
| 2021/0337400 A1 | 10/2021 | Jat et al. | |
| 2022/0377582 A1 | 11/2022 | Sakamoto et al. | |
| 2022/0417768 A1 | 12/2022 | Yao et al. | |
| 2023/0418279 A1 * | 12/2023 | Zhu | G05B 23/0272 |
| 2024/0373324 A1 | 11/2024 | Glenn et al. | |

FOREIGN PATENT DOCUMENTS

| | | |
|---|---|---|
| EP | 1117221 A2 | 7/2001 |
| EP | 1345456 A2 | 9/2003 |
| EP | 1226725 B1 | 10/2004 |
| EP | 1867136 A2 | 12/2007 |
| EP | 1894403 A1 | 3/2008 |
| EP | 2150067 A1 | 2/2010 |
| EP | 2625626 A2 | 8/2013 |
| EP | 2478665 B1 | 11/2014 |
| EP | 2854343 A1 | 4/2015 |
| EP | 2864908 A2 | 4/2015 |
| EP | 3780682 A1 | 2/2021 |
| EP | 3697064 B1 | 9/2022 |
| JP | 2000-215143 A | 8/2000 |
| KR | 10-0376584 B1 | 3/2003 |
| WO | 2004/071012 A1 | 8/2004 |
| WO | 2010126465 A1 | 11/2010 |
| WO | 2014/106073 A1 | 7/2014 |
| WO | 2014129936 A1 | 8/2014 |
| WO | 2015030897 A1 | 3/2015 |
| WO | 2015/078485 A1 | 6/2015 |
| WO | 2015103296 A1 | 7/2015 |
| WO | 2018/022360 A1 | 2/2018 |
| WO | 2018182223 A1 | 10/2018 |
| WO | 2019016389 A1 | 1/2019 |
| WO | 2020/086409 A1 | 4/2020 |
| WO | 2024/097129 A1 | 5/2024 |

* cited by examiner

500

602

604

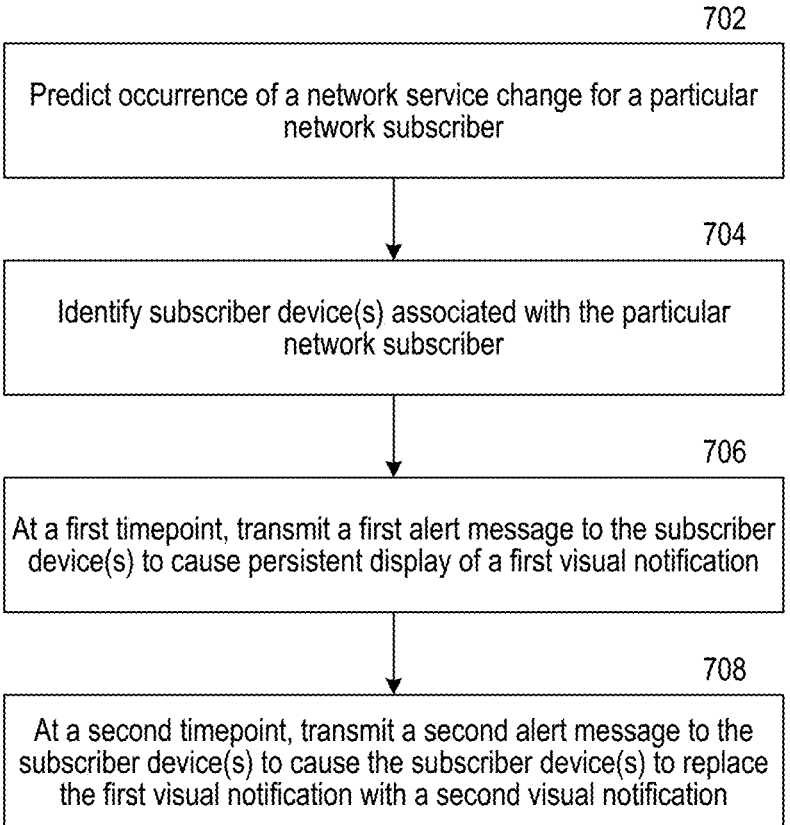

702

Predict occurrence of a network service change for a particular network subscriber

704

Identify subscriber device(s) associated with the particular network subscriber

706

At a first timepoint, transmit a first alert message to the subscriber device(s) to cause persistent display of a first visual notification

708

At a second timepoint, transmit a second alert message to the subscriber device(s) to cause the subscriber device(s) to replace the first visual notification with a second visual notification

ESCALATED AND PERSISTENT MESSAGES FOR NETWORK SERVICE ACCESS BY SUBSCRIBER DEVICES OF A WIRELESS TELECOMMUNICATION NETWORK

BACKGROUND

Wireless telecommunication networks provide communication services for end users at user devices that are subscribed to the networks. The user devices subscribed to a wireless telecommunication network are also referred herein as subscriber devices. These communication services provided by a wireless telecommunication network include connectivity to data networks (e.g., the Internet), telephone calling services, text messaging services, and more. Efficient operation of a wireless telecommunication network requires management of access to these communication services by different subscriber devices.

BRIEF DESCRIPTION OF THE DRAWINGS

Detailed descriptions of implementations of the present disclosure will be described and explained through the use of the accompanying drawings.

FIG. 7 is a flow diagram that illustrates example operations for enhanced subscriber device messaging for predicted network service changes, in accordance with embodiments of the present disclosure.

Figure 1:
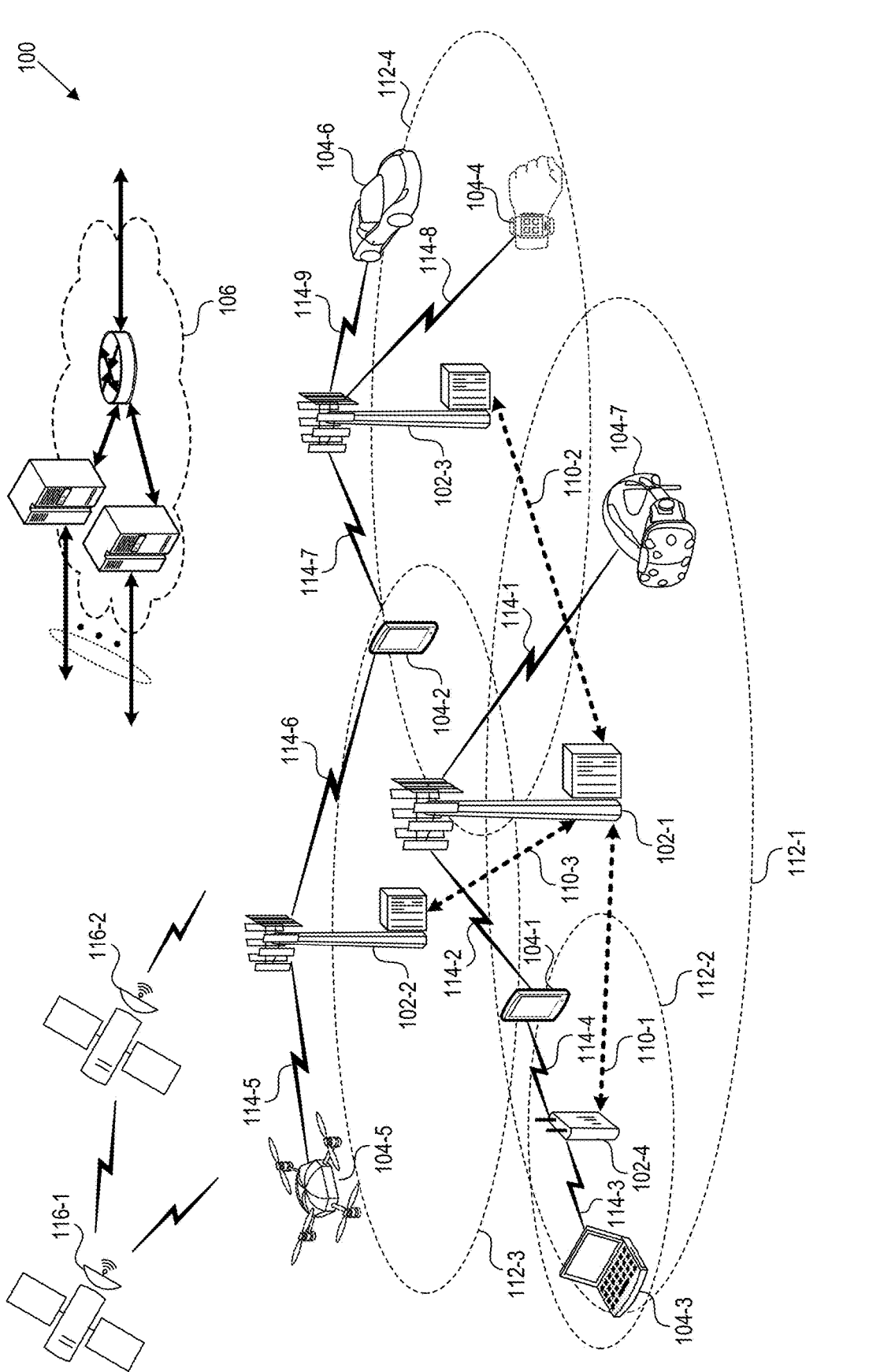
FIG. 1 is a block diagram that illustrates a wireless telecommunication network that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology provides improved techniques for communicating with subscriber devices of a wireless telecommunication network, in particular, regarding predicted changes to network service access by the subscriber devices. Such changes to network service access can relate to network outages (e.g., due to network maintenance, due to unexpected damage to the network), expected device location (e.g., traveling to a different region not covered by the network), current and/or projected deficiencies of prior service usage requirements (e.g., failure by a network subscriber to pay a bill, failure to timely update a system software of the subscriber device), and/or the like. According to example implementations, subscriber devices are preemptively alerted and notified of upcoming changes to network service access in a persistent and escalating manner, thereby increasing a likelihood that the subscriber devices can perform proactive and/or prevention operations to handle the upcoming changes to network service access. Further, this subscriber messaging is network-controlled to ensure that users receive and act on the communicated information, in that a persistently displayed notification cannot be dismissed by user inputs.

In particular, persistent messages that are specifically related to the upcoming network service changes are persistently displayed irrespective of user input until a specific command from the wireless telecommunication network is transmitted. According to example implementations, the wireless telecommunication network includes subsystems that act to predict the upcoming network service changes and verify whether the upcoming network service changes are preempted or prevented based on certain user actions. Such user actions (e.g., updating the system software, paying a past due bill, configuring a subscriber device for a different region) result in subscriber data being stored and/or modified within the wireless telecommunication network, and this subscriber data in the network—as opposed to local device data or user actions-control the display of the persistent messages. As such, in example implementations, display of critical information needed to anticipate and account for upcoming network service changes cannot be arbitrarily dismissed, ignored, hidden, or the like, resulting in a more robust, responsive, and efficient operation to handle upcoming network service changes for subscriber devices of a wireless telecommunication network.

In some implementations, the messages provided by the wireless telecommunication network to subscriber devices to inform the subscriber devices of upcoming network service changes are configured according to a time-based escalation. For example, at given timepoints prior to an upcoming network service change, the messages displayed at a subscriber device can dynamically increase in display area, alert volume, text size, and/or the like. In some implementations, the messages displayed at a subscriber device include deep links to local user applications stored on the subscriber device that are configured to initiate certain prevention operations tied to the upcoming network service change. In some implementations, the wireless telecommunication network distributes messages to certain groups of subscriber devices based on relationship and/or account data that indicate which subscriber devices belong to a common subscriber entity; therefore, subscriber messaging on network service changes can be provided on a multi-device scale.

Accordingly, example implementations disclosed herein provide technical benefits and improvements to the management of subscriber devices of a wireless telecommunication network. The wireless telecommunication network, via enhanced subscriber messaging, can manage access to network services by subscriber entities in response to the enhanced subscriber messaging. For example, the wireless telecommunication network can be assured that access to certain network services by certain subscriber entities can be restricted based on inaction following the enhanced subscriber messaging. The enhanced subscriber messaging according to example implementations disclosed herein increases a likelihood that information is reliably and robustly communicated to subscriber entities and that prevention operations are performed to avoid unnecessary network service changes and corresponding changes to network configurations. Therefore, based on this increased likelihood, management operation of network configurations, network services, subscriber access, and more is improved.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Wireless Communications Systems

FIG. 1 is a block diagram that illustrates a wireless telecommunication network 100 in which aspects of the disclosed technology are incorporated. For example, the wireless telecommunication network 100 is configured to predict network service changes for network subscribers and alert the network subscribers via enhanced subscriber messaging that can span multiple subscriber devices and that can be configured for persistent display controlled by network-originated commands. According to example implementations, the wireless telecommunication network 100 can judicially restrict service access subsequent to the enhanced subscriber messaging and accordingly lighten network load. Additionally, the wireless telecommunication network 100 can avoid unnecessary updates to network configurations and policies that would modify network service access for a subscriber based on prompting performance of prevention operations at subscriber devices of the subscriber.

The wireless telecommunication network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The wireless telecommunication network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of the wireless telecommunication network 100 also include wireless devices 104-1 through 104-7 (referred to individually as "wireless device 104" or collectively as "wireless devices 104" and also referred to herein as user equipment or UE) and a core network 106. The wireless devices 104-1 through 104-7 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

Wireless devices 104 can include subscriber devices. Subscriber devices include devices that are associated with subscriber entities (e.g., a person, a group of persons, a defined organization or entity) who subscribe to the wireless telecommunication network (and/or with a network operator associated with the wireless telecommunication network) to receive network services via the wireless telecommunication network. For example, network services that can be provided to subscriber entities include data network access or connectivity (e.g., the Internet), telephone calling services, text messaging services, cloud storage and/or computing services, and/or the like. In some examples, the network services are provided to a subscriber entity via the wireless telecommunication network based on subscription requirements or subscription agreements (also referred to as service conditions, service requirements, service configurations). Such requirements and agreements can include the subscriber entity using specific devices (e.g., devices manufactured by the network operator, devices pre-configured by the network operator) to receive the network services, the subscriber devices being configured with specific software or applications, the subscriber entity paying a subscription/service fee or bill, the subscriber devices being located in a certain region or jurisdiction, and/or the like. Different subscriber entities belonging to the wireless telecommunication network 100 can be associated with different subscription requirements, and the wireless telecommunication network 100 can store subscriber data that describes the different subscription requirements for different subscriber entities. According to example implementations, the wireless telecommunication network 100 is configured to monitor the subscription requirements for subscriber entities and determine or predict whether the subscription requirements will be violated, which would result in network service changes or restriction for a subscriber. For example, the wireless telecommunication network 100 is configured to determine or predict that a subscriber fails to pay a subscription bill. Based on the determination or prediction related to subscription requirements, the wireless telecommunication network 100 is configured to provide persistent and dynamically escalating messages to subscriber devices.

Wireless devices 104 of the wireless telecommunication network 100 vary in type and capability. For example, the wireless devices 104 illustrated in FIG. 1 includes a head-mounted device (HMD) that is configured to execute XR services (104-7), a smart watch device (104-4), a mobile phone (104-1), and others. The wireless devices 104 each execute different services or applications and according to aspects of the disclosed technology, handover of the wireless devices 104 within the wireless telecommunication network 100 is specific to each wireless device 104 and the services or applications presently being executed at each wireless device 104.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The wireless telecommunication network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The wireless telecommunication network 100 can include a 5G network and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The wireless telecommunication network 100 can thus form a heterogeneous network in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the wireless telecommunication network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed d throughout the wireless telecommunication network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber device, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network equipment at the edge of the wireless telecommunication network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in wireless telecommunication network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links. In handover operations, communication links 114 can be created, redirected or modified, and/or terminated in order to provide UE mobility within the wireless telecommunication network 100.

In some implementations of the wireless telecommunication network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the wireless telecommunication network 100 implements 6G technologies including increased densification or diversification of network nodes. The wireless telecommunication network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the wireless telecommunication network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the wireless telecommunication network 100 can implement a converged Radio Access Network (RAN) and Core architecture to achieve Control and User Plane Separation (CUPS) and achieve extremely low User Plane latency. In yet another example of 6G, the wireless telecommunication network 100 can implement a converged Wi-Fi and Core architecture to increase and improve indoor coverage.

Example Telecommunication Network Functions

Figure 2:
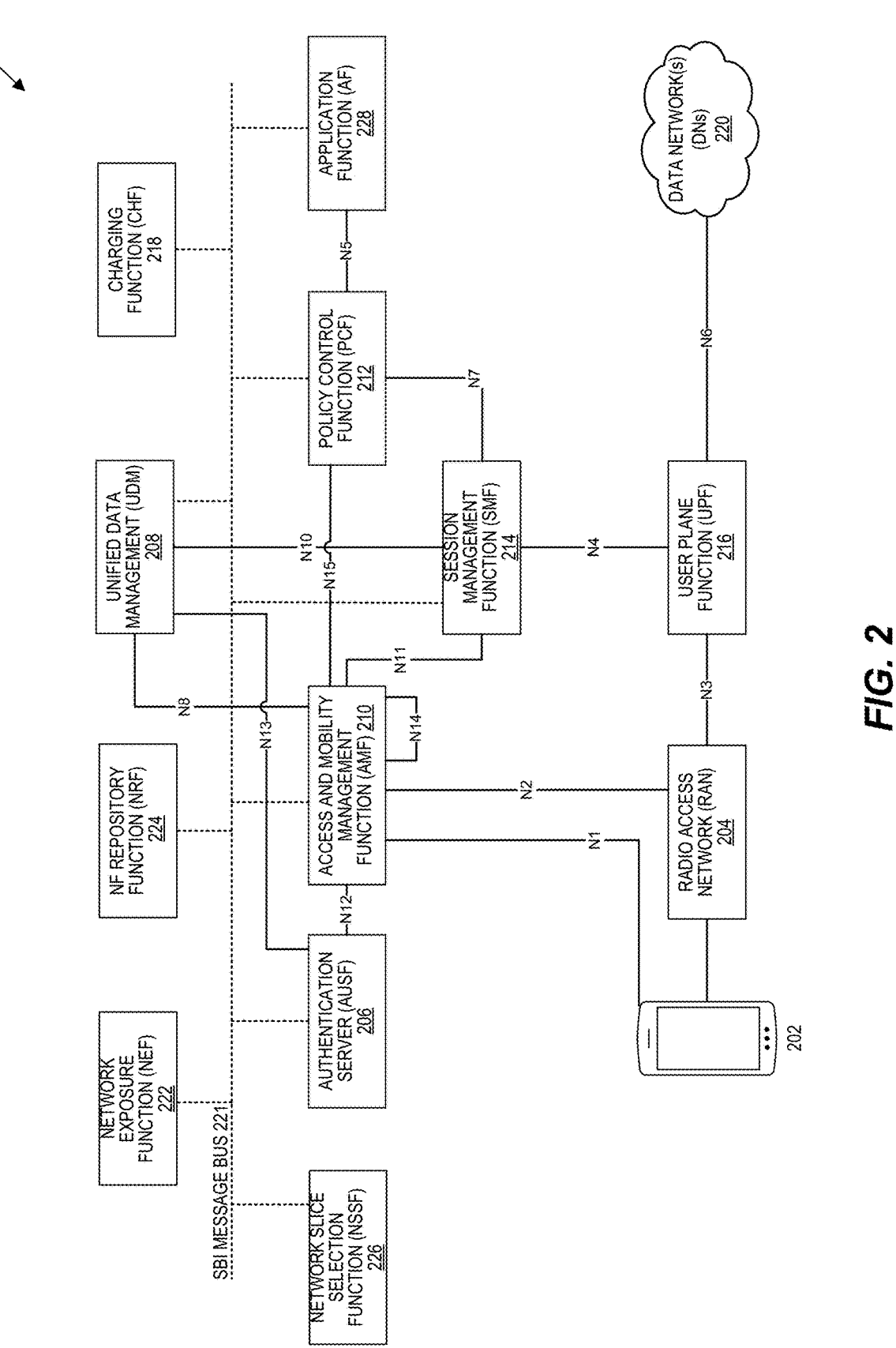
FIG. 2 is a block diagram that illustrates network functions (NFs) of a wireless telecommunication network that can implement aspects of the present technology.

FIG. 2 is a block diagram that illustrates an architecture 200 including network functions (NFs) that are related to aspects of the present technology. For example, the network functions in the illustrated example belong to a 5G core network. It will be appreciated that the disclosed technology is also applicable to network functions associated with a 4G LTE core network (e.g., Evolved Packet Core, or EPC), a 6G core network, and/or the like.

According to FIG. 2, a wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218. In some implementations, one or more NFs of the core network perform example operations described herein to detect network-supported services being executed by a UE, provide event thresholds that correspond to network-supported services to UEs, and facilitate handover of UEs between network cells and/or nodes.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context. For example, the UDM 208 stores subscription requirements for different subscribers, identifies different subscriber devices associated with a particular subscriber, and perform other techniques disclosed or related to those disclosed herein.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Example Implementations of Enhanced Subscriber Device Messaging

Example aspects of the present disclosure relate to managing access and usage of network services by different subscriber devices. In particular, example implementations disclosed herein preemptively alert and notify subscriber devices of predicted changes to respective service access or usage conditions with a wireless telecommunication network. According to example implementations, this enhanced subscriber messaging includes persistent display of notifications that is controlled based on network-originated commands, in contrast to local user inputs at subscriber devices. According to example implementations, subscriber devices also dynamically escalate displayed notifications in accordance with timepoints prior to a predicted network service change, with the escalated notifications having an increased likelihood of prompting performance of prevention operations.

Figure 3:
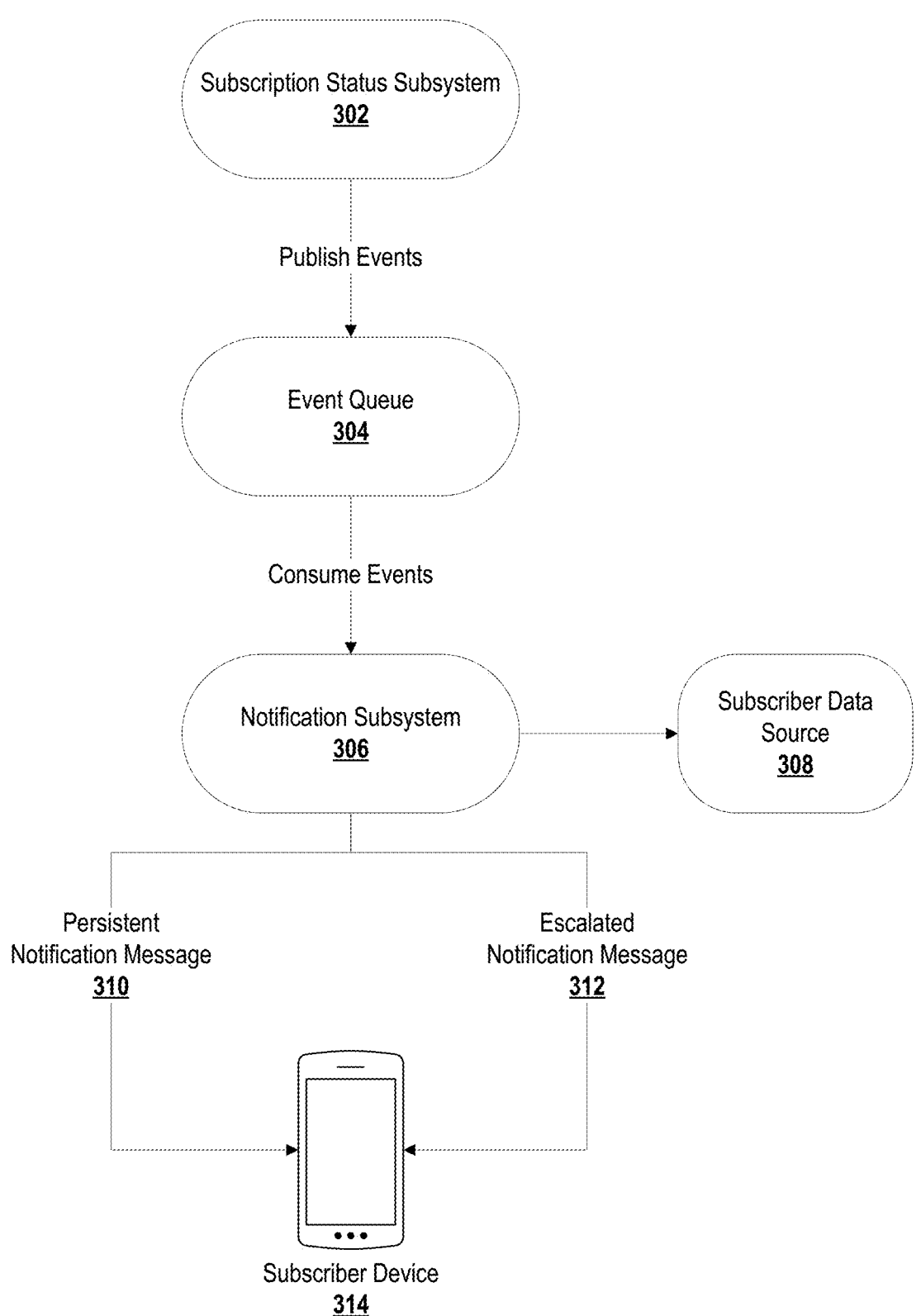
FIG. 3 is a block diagram that illustrates subsystems of a wireless telecommunication network for enhanced subscriber device messaging for predicted network service changes.

FIG. 3 is a block diagram that illustrates enhanced subscriber messaging related to predicted network service changes for subscribers of a wireless telecommunication network. In the illustrated implementation, the wireless telecommunication network includes a subscription status subsystem 302, an event queue 304, a notification subsystem 306, and a subscriber data source 308. These components of the wireless telecommunication network operate to dynamically provide enhanced subscriber device messaging to a subscriber device 314 of the wireless telecommunication network. The messages provided to the subscriber device 314 include a persistent notification message 310 and an escalated notification message 312.

According to the illustrated implementation, the subscription status subsystem 302 publishes an event corresponding to "change of subscription status" to the event queue 304. The event indicates a change in subscription status that predicts or indicates a change in network services for a particular subscriber. For example, the event indicates that a subscription bill to be paid by the particular subscriber is past due, or that a subscription requirement for the particular subscriber (e.g., a software or firmware version of a subscriber device, a location of the subscriber device within a particular region) is not met. The change in subscription status thus corresponds to a change in network services for the particular subscriber. In some implementations, the event includes information such as a unique identifier associated with the particular subscriber, a unique identifier for the type of subscription status change (e.g., past due bill, device incompatibility), a predicted time at which the resulting network service change will occur, and/or the like.

The notification subsystem 306 subscribes to the event queue 304 to listen for events published by the subscription status subsystem 302. The notification subsystem 306 then detects and consumes the event published by the subscription status subsystem 302 that indicates a change in subscription status and accordingly predicts the change in network service. The notification subsystem 306 extracts a unique identifier (e.g., an account number, a customer number, a mobile station international subscriber directory number or MSISDN) from the event.

The notification subsystem 306 references the subscriber data source using the unique identifier extracted from the event. For example, the notification subsystem 306 looks up the unique identifier via an application programming interface (API) provided by the subscriber data source 308 to obtain subscriber information, including a group of subscriber devices associated with the particular subscriber, permission levels associated with different subscriber devices associated with the particular subscriber, subscription requirements associated with the particular subscriber and with the network services for the particular subscriber, a predicted time when the network service change will occur (e.g., a deadline to satisfy subscription requirements), and/or the like. In some implementations, the notification subsystem 306 obtains a machine learning (ML)-based recommendation for certain prevention operations based on the unique identifier for the particular subscriber. For example, the wireless telecommunication network (and/or the subscriber data source 308) includes a machine learning model that is configured and trained to select a certain prevention operation (e.g., an immediate one-time payment, a payment arrangement over a particular schedule) based on a predicted likelihood that the change in subscription status will reoccur. The machine learning model can be trained on subscriber-specific data that includes historical information relating to past changes in subscription status and/or in network services for different historical subscribers.

The notification subsystem 306 then constructs the notification message content. The notification subsystem 306 constructs a persistent notification message 310 based on the event in the event queue 304 indicating the change in subscription status. The notification subsystem 306 constructs the notification message content to include the subscriber information obtained from the subscriber data source 308, including action deadlines, subscription requirements, ML-based recommendations, and/or the like.

The notification subsystem 306 then sends the persistent notification message 310 to the subscriber device 314. For example, the notification subsystem 306 transmits the persistent notification message 310 to cause the subscriber device 314 to persistently display a visual notification indicating the change in subscription status and the upcoming change in network service. In some implementations, the notification subsystem 306 sends the persistent notification message 310 to a background system-level application client that is pre-loaded and running on the subscriber device 314. The background system-level application client is configured to generate the visual notification and cause the operating system of the subscriber device 314 to persistently display the visual notification. The visual notification includes the content received in the persistent notification message 310. In some implementations, the persistent notification message 310 indicates or includes an active message type or "running" message type that causes the persistent display of the visual notification by the operating system of the subscriber device 314.

The persistent display of the visual notification refers to the continued display of the visual notification irrespective of user inputs at the subscriber device 314 intended to dismiss the visual notification. For example, while other notifications are configured to be dismissed based on user inputs (e.g., a swipe of the notification in a particular direction, an interaction with a 'close' or 'clear' option), the persistently displayed visual notification is configured to lack dismissal options or to not respond to dismissal user actions. According to example implementations, the persistent visual notification is only dismissed based on a command from the wireless telecommunication that is only sent upon successful completion of a prevention operation that remedies the change in subscription status of the particular subscriber (e.g., payment of the past due bill, updating device software to be compatible). Therefore, display of visual notifications of upcoming network service changes are network-controlled, thereby improving robustness and enabling verification of information communication.

In some implementations, the notification subsystem 306 can send updated content for the persistently displayed visual notification. For example, the notification subsystem 306 can send updated recommendations, updated deadlines, updated payment amounts or requirements, and/or the like. In an example, the updated content includes a dynamic countdown for an upcoming network service change; the notification subsystem 306 repeatedly updates the content to accurately reflect the number of weeks, days, hours left before the upcoming network service change. For example, after a day passes, the notification subsystem 306 updates notification content from 12 days remaining before network service change to 11 days remaining before network service change. Because the notification subsystem 306 provides the updated content including a dynamic countdown, security and accuracy of the notification is maintained. For example, the subscriber device does not locally determine the countdown content, thus depriving a user or third-party of any opportunity to maliciously manipulate the countdown content to cause miscommunication of information or cause the notification to be prematurely dismissed or removed. Thus, the notification is effectively controlled by the network.

When the notification subsystem 306 sends updated content for the notification, the subscriber device 314 (e.g., the background system-level application client running on the subscriber device 314) dismisses the currently displayed visual notification and replaces it with a new visual notification. The new visual notification can also be persistently displayed. Again, persistent display of visual notifications related to upcoming network service changes is controlled from the wireless telecommunication network, and in some examples, cannot be controlled by local user inputs.

Figure 4:
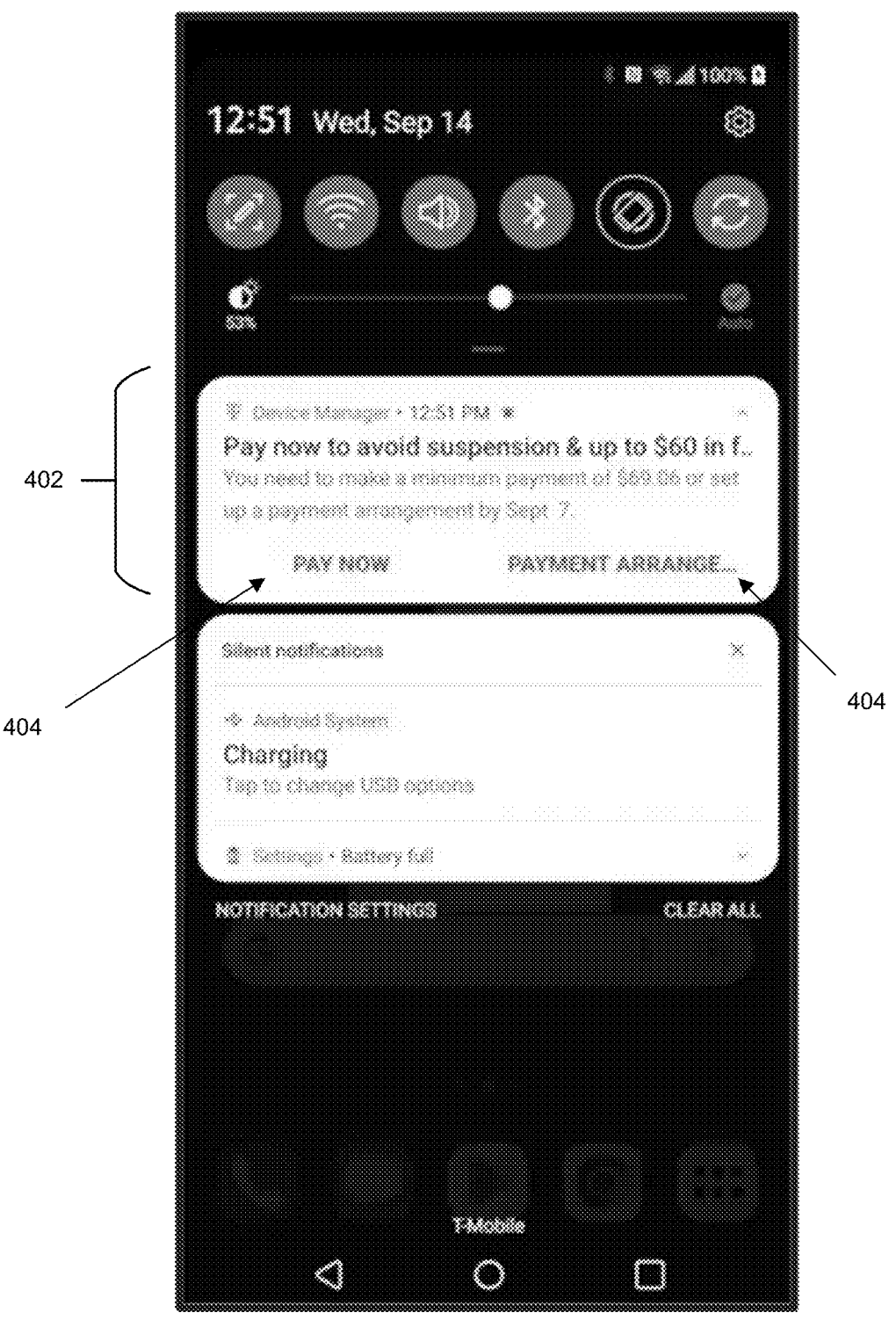
FIG. 4 illustrates an example of a persistently-displayed visual notification on a subscriber device of a wireless telecommunication network that indicates a predicted network service change for a subscriber.

FIG. 4 illustrates an example of a persistently-displayed visual notification 402 that indicates an upcoming network service change. As discussed, display of the persistently-displayed visual notification 402 at the subscriber device is controlled by the wireless telecommunication network; for example, the persistently-displayed visual notification 402 is dismissed based on a specific command from the wireless telecommunication network, in contrast to local user inputs that can dismiss other types of notifications. As shown, the persistently-displayed visual notification 402 can be located in a system notification shade, a system notification pane, a system notification screen, a system notification bar, and/or the like and can be persistently displayed when the system notification shade (or the like) is opened.

Because of the different display mechanism of the persistently-displayed visual notification 402 compared to other system notifications (e.g., a battery charging notification that can be dismissed), the persistently-displayed visual notification 402 and its indicated information relating to an upcoming network service change breaks through messaging and notification clutter on the subscriber device. Accordingly, the wireless telecommunication network provides an escalated notification (relative to other system notifications, such as a battery charging notification, or application notifications, such as message or calling notifications) that cannot be dismissed until network-side actions are successfully completed.

The persistently-displayed visual notification 402 can convey the current status of the subscriber associated with the subscriber device (e.g., past due on a subscription bill), clearly call out a deficit related to a subscription requirement (e.g., a past due bill amount), indicate deadlines for complying with the subscription requirement, and indicate the consequential network service changes.

The persistently-displayed visual notification 402 also includes application links 404 that enable the user of the subscriber device to initiate and/or perform prevention operations to prevent the upcoming network service change. In FIG. 4, the persistently-displayed visual notification 402 includes an application link 404 for a Pay Now operation that prevents the upcoming network service change (suspension of network services) and an application link 404 for a Payment Arrangements operation that also prevents the upcoming network service change. In some implementations, the application links 404 are deep links to a local user application stored on the subscriber device in which the user can initiate and/or perform the prevention operations. In some examples, each application link 404 refers to a different portion or module of the local user application and/or to a different local user application. Upon user selection of an application link 404, the subscriber device can open and display the local user application. In some implementations, each application link 404, when selected by the user, transmits a command or API call to the local user application that automatically causes the local user application to initiate the prevention operation without the local user application being displayed. In doing so, the user of the subscriber device is able to quickly anticipate and address the upcoming network service change without the subscriber device switching being applications and displays.

In some implementations, the persistently-displayed visual notification 402 includes the application links 404 (e.g., deep links) if the subscriber device stores subscriber authentication or account information (e.g., via the user previously logging in to a subscriber account or profile on the subscriber device). The application links 404 of the persistently-displayed visual notification 402 can refer to sensitive or personal information within the local user application, and thus, the persistently-displayed visual notification 402 includes the application link 404 based on a determination that the subscriber device stores the subscriber authentication or account information, in order to preserve data privacy and sensitivity. Therefore, the persistently-displayed visual notification 402 can lack the application links 404, for example, if the user of the subscriber device has not previously logged in to the subscriber account or profile on the subscriber device. Alternatively, the persistently-displayed visual notification 402 includes an application link 404 that refers to a resource, application, webpage, or the like at which the user can log in to the subscriber account or profile and demonstrate authorization to access sensitive or private subscriber information.

Some implementations provide a persistent notification in a different modality in addition to or in alternative to a persistently-displayed visual notification. In some examples, the subscriber device provides a periodic or repeated audio signal that indicates the upcoming network service change. In some examples, the subscriber device provides a persistent, periodic, or repeated haptic signal (e.g., a phone vibration) that indicates the upcoming network service change. Different one or more modes of persistent signals are provided by subscriber devices based on preferences and configurations associated with the subscriber. Such preferences and configurations for persistent signaling mode can be applied to each subscriber device associated with the subscriber.

Figure 5:
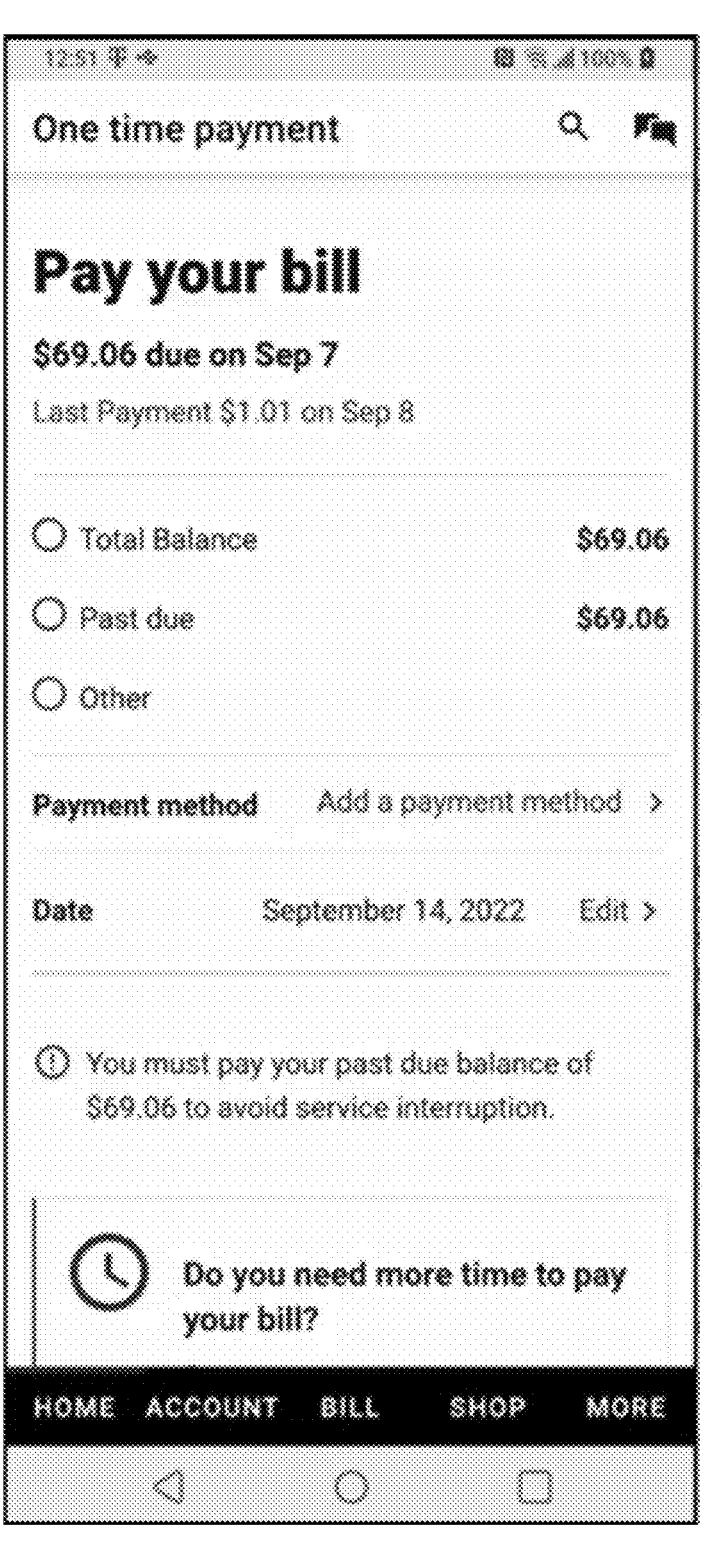
FIG. 5 illustrates an example of a local user application on a subscriber device that enables prevention of changes to network services provided by a wireless telecommunication network to the subscriber device.

FIG. 5 illustrates an example of a local user application 500 on a subscriber device that enables prevention of changes to network services provided by a wireless telecommunication network to the subscriber device. For example, the subscriber device opens the local user application 500 response to use selection of the application link 404 for the Pay Now operation as shown in FIG. 4. In the local user application, the user of the subscriber device can initiate and/or perform prevention operations that result in the subscriber satisfying the subscription requirements, thereby avoiding the upcoming network service change. In some implementations, the local user application is configured to communicate (e.g., via an API) with the subscription status subsystem 302 and/or the subscriber data source 308 of the wireless telecommunication network to change the subscription status associated with the subscriber. For example, upon conclusion of a payment operation initiated via the local user application 500, the subscription status subsystem 302 can determine a compliant subscription status for the subscriber.

Therefore, the notification subsystem 306 can cause a persistent notification to be displayed at a subscriber device 314 based on a particular event indicating a change in subscription status being published to the event queue 304, and the persistent notification can be connected to a local user application for preventing an upcoming network service change.

As the upcoming network service change approaches in time, the wireless telecommunication network can escalate the persistently-displayed visual notification to further increase a likelihood that the subscriber takes action to prevent the upcoming network service change. In some implementations, the wireless telecommunication network dynamically escalates, replaces, or transitions the persistently-displayed visual notification to a fullscreen notification message displayed on the subscriber devices associated with a particular subscriber. The fullscreen notification message occupies a greater display area, and can increase the amount of information communicated.

Returning to FIG. 3, the subscription status subsystem 302 publishes another event relating to the impending network service change in the event queue 304. In some examples, this event is a second event that corresponds to "24 hours remaining before change of network service" or a similar length of time (e.g., one hour, ten hours, 24 hours, two days) leading up to the change in network service. This second event effectively indicates a specific passage of time since the first event (corresponding "change of subscription status") since when the network service change has not been prevented. As such, the second event is published conditional on the first event having been previously published and on the wireless telecommunication network failing to determine that the network service change has been prevented or avoided (e.g., by way of a prevention operation).

The notification subsystem 306 again detects and consumes the second event in the event queue 304 and retrieves subscriber information from the subscriber data source 308. In response to detecting the second event, the notification subsystem 306 constructs a fullscreen notification message content for a fullscreen notification message that will dynamically replace the persistent notification message 310 being persistently displayed on the subscriber device 314. The notification subsystem 306 then sends the escalated notification message 312 to the subscriber device 314, or to the background system-level application client on the subscriber device 314. In response, the subscriber device 314 provides a fullscreen visual notification. The fullscreen visual notification is configured to convey increased urgency due to the short length of time prior to the change in network service for the subscriber and due to the inaction during the display of the persistent message.

Figure 6:
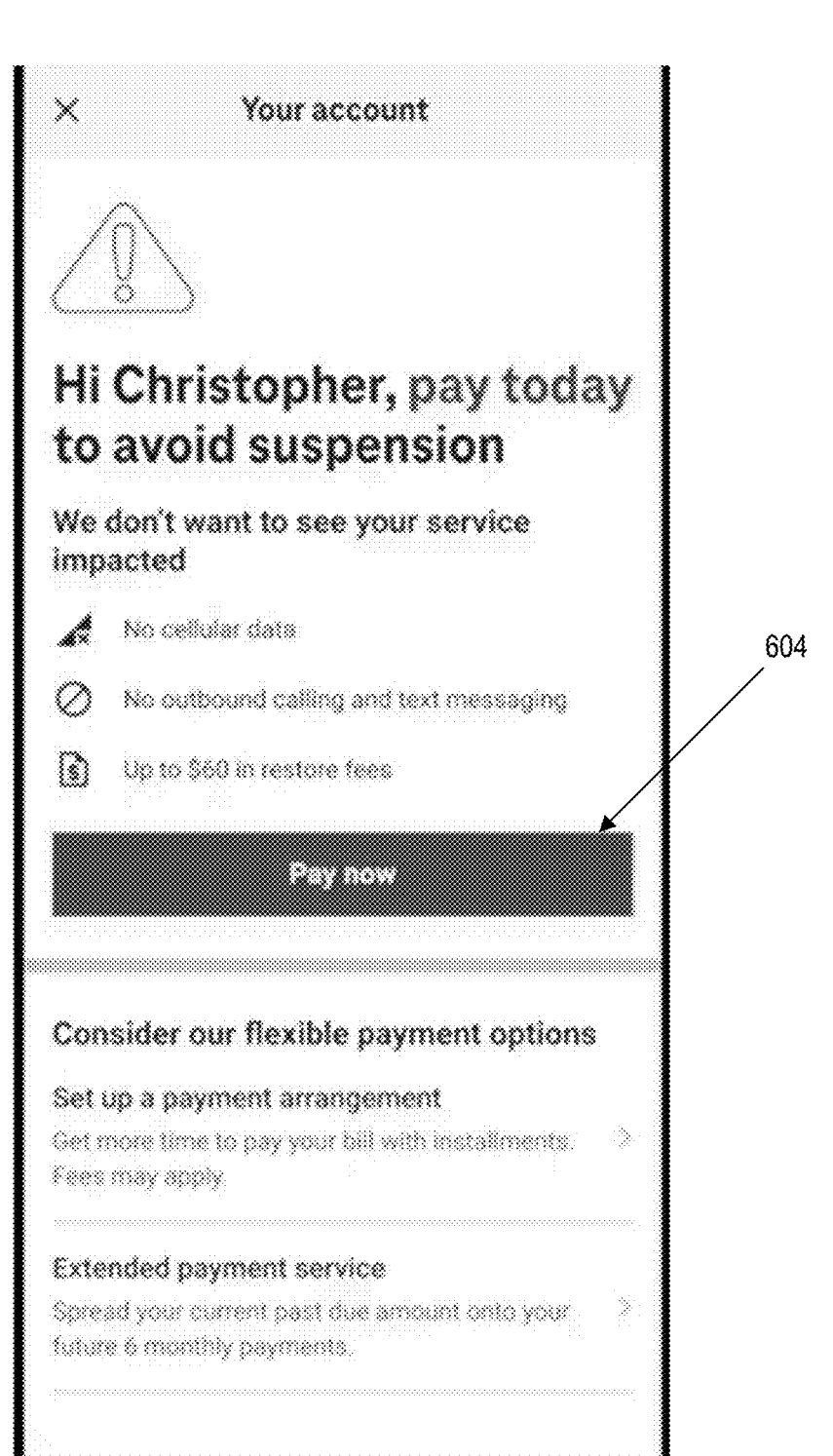
FIG. 6 illustrates an example of a dynamically-escalated visual notification on a subscriber device of a wireless telecommunication network that indicates a predicted network service change for a subscriber.

FIG. 6 illustrates an example of a dynamically-escalated visual notification on a subscriber device of a wireless telecommunication network that indicates a predicted network service change for a subscriber. In particular, FIG. 6 illustrates a fullscreen visual notification 602 having a maximum display area or an increased display area (relative to the persistently-displayed visual notification 402), such that the predicted network service change is clearly conveyed. The fullscreen visual notification 602 also enables prevention operations to be initiated, via an application link 604 that connects to a local user application on the subscriber device. In some implementations, the fullscreen visual notification 602 is a passive message type that can be locally dismissed by user inputs. In some implementations, the persistently-displayed visual notification 402 can continue to be displayed after dismissal or removal of the fullscreen visual notification 602. In some implementations, the subscriber device is configured to (in response to the escalated notification message) display a dynamically-escalated visual notification repeatedly and/or periodically. For example, the subscriber device displays the fullscreen visual notification 602 each time the subscriber device is unlocked, powered on, woken from a sleep state, and/or the like.

The escalated notification message 312 is a time-triggered escalation of the persistent notification message 310 and is accordingly conditional upon at least the previous transmission of the persistent notification message 310. In some examples, in response to a prevention operation being performed, the subscription status subsystem 302 publishes a third event that indicates that the predicted network service change has been prevented for a given subscriber. The third event being published in the event queue 304 obviates the second event being published in the event queue 304 (as the impending network service change has been prevented). In response to the third event being published in the event queue, the notification subsystem 306 detects the third event and accordingly transmits a command to the subscriber devices to dismiss the persistently-displayed visual notification. Accordingly, network-side control (in contrast to local control) of persistent notification display is achieved via the third event being published in the event queue.

While FIG. 3 illustrates one subscriber device, the persistent notification message 310 and/or the escalated notification message 312 can be transmitted to multiple subscriber devices associated with a particular subscriber. The subscription information obtained from the subscriber data source 308 can identify multiple subscriber devices (e.g., associated with multiple users) associated with a particular subscriber. In some implementations, a subscriber entity includes a plurality of users, and the notification subsystem 306 can transmit the persistent notification message 310 and/or the escalated notification message 312 to multiple of the plurality of users. For example, the subscription information includes a mapping of a subscriber identifier (e.g., an account number) to multiple MSISDNs that correspond to different subscriber devices each belonging to a user associated with the subscriber identified by the subscriber identifier.

In some examples, the escalated notification message 312 represents an escalation with respect to reach. For example, the notification subsystem 306 transmits the escalated notification message 312 to an increased number of devices relative to the persistent notification message 310. In some implementations, different users of a subscriber entity are associated with different permission levels, which is indicated by the subscriber information from the subscriber data source 308. The notification subsystem 306 can accordingly transmit the persistent notification message 310 and/or the escalated notification message 312 to user subsets of the subscriber entity. For example, the notification subsystem 306 only transmits the persistent notification message 310 and/or the escalated notification message 312 to a first user subset associated with a first permission level, and not to a second user subset associated with a second permission level. In some examples, the permission levels associated with users of a subscriber entity can correspond to configurable notification preferences, configurable access to sensitive information of the subscriber entity (e.g., payment methods, demographic information, collected service usage data), configurable ability to initiate or perform prevention operations, and/or the like.

Example Operations for Escalating Subscriber Device Management

FIG. 7 illustrates a flow diagram that includes example operations for enhanced subscriber messaging for network service changes, and the example operations are performed by a notification system (e.g., the notification subsystem 306 of FIG. 3).

At 702, the notification system predicts an occurrence of a network service change for a particular network subscriber. In some implementations, the notification system includes an event-listening module that is configured to detect events published in a network event queue. In some implementations, the notification system detects or identifies an occurrence of a network service change in real-time. For example, the notification system determines, identifies, detects, schedules, causes, and/or the like an occurrence of a network service change, in response to an event published in the network event queue. The events published in the network event queue indicate future occurrences of network service changes for network subscribers of the wireless telecommunication network. Accordingly, the notification system predicts the occurrence of the network service change based on a first event being published in a network event queue of the wireless telecommunication network. The first event can include a unique identifier associated with the particular network subscriber, and can indicate a failure by the particular network subscriber to satisfy one or more predefined service requirements associated with a network service (thereby resulting in an upcoming network service change or suspension). In other examples, the first event can indicate a scheduled network service suspension for multiple subscribers (e.g., for network maintenance), a predicted departure of a subscriber from a supported region, and/or the like.

At 704, the notification system identifies one or more subscriber devices associated with the particular network subscriber. In some implementations, the notification system includes a device-identification module configured to identify the one or more subscriber devices associated with the particular network subscriber via the unique identifier included in the first event.

At 706, the notification system transmits, at a first timepoint, a first alert message to the subscriber devices to cause the subscriber devices to persistently display a first visual notification. The first visual notification is a persistently-displayed visual notification (e.g., the persistently-displayed visual notification 402 of FIG. 4) that conveys the first event and upcoming network service change. In some implementations, the notification system includes a first alert module configured to transmit, in response to the event-listening module detecting a first event indicating a first length of time before a network service change for a particular network subscriber, the first alert message to the subscriber devices associated with the particular network subscriber.

At 708, the notification system transmits, at a second timepoint, a second alert message to the subscriber devices to cause the subscriber devices to dynamically replace the first visual notification with a second visual notification. The second visual notification is a dynamically-escalated visual notification (e.g., the fullscreen visual notification 602 of FIG. 6). In some implementations, the notification system includes a second alert module configured to transmit, in response to the event-listening module detecting a second event indicating a second length of time before the network service change for the particular network subscriber, the second alert message to the subscriber devices. In some implementations, the subscriber devices are configured to resume persistent display of the first visual notification after the second visual notification is dismissed.

In some implementations, the notification system further includes a prevention module configured to receive a request from a given subscriber device in response to the first alert message. The request indicates a prevention operation that prevents the network service change for the particular network subscriber. The prevention module is further configured to cause the prevention operation to be executed (e.g., by the subscription status subsystem or other subscriber management components of the network). The prevention module is further configured to transmit, in response to the event-listening module detecting a third event that indicates a completion of the prevention operation, a specific command to each subscriber device to dismiss the first alert message.

In some implementations, the notification system further includes a selection module configured to select a particular prevention operation for the particular network subscriber via a machine learning model that is trained to select the particular prevention operation based on predicting a likelihood that the first event will reoccur based on subscriber-specific data. The selection module is further configured to include the particular prevention operation in the first alert message and the second alert message. For example, the notification system can include the Payment Arrangement option in the persistently-displayed visual notification 402 of FIG. 4 based on a selection thereof by the machine learning model.

Example Computer Systems

Figure 8:
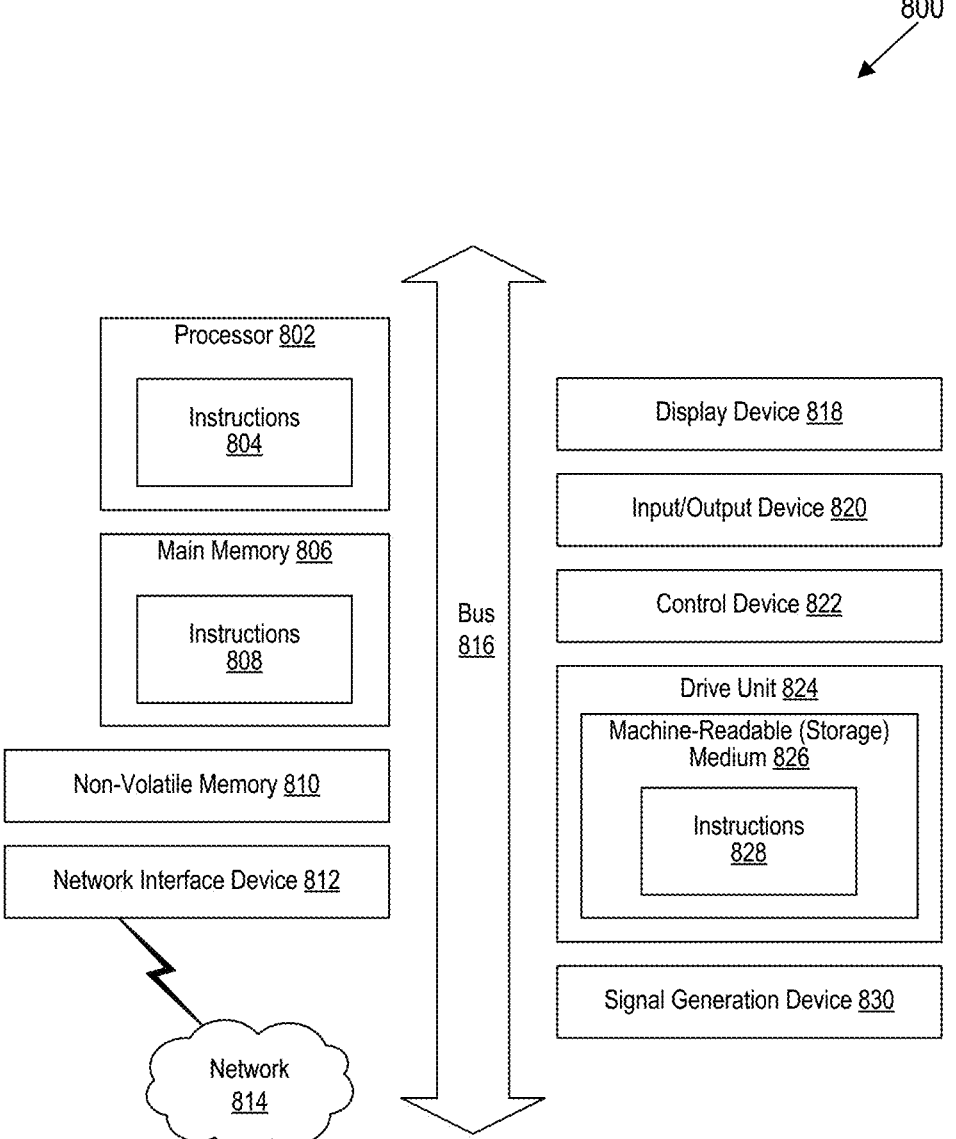
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computer system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 800. In some implementation, the computer system 800 can be an embedded computer system, a system-on-chip (SOC), a single-board computer system (SBC) or a distributed system such as a mesh of computer systems or include one or more cloud components in one or more networks. Where appropriate, one or more computer systems 800 can perform operations in real-time, near real-time, or in batch mode.

The network interface device 812 enables the computer system 800 to mediate data in a network 814 with an entity that is external to the computer system 800 through any communication protocol supported by the computer system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computer system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computer system 800 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the disclosed technology. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the present disclosure, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the present disclosure should not be taken to imply that the terminology is being redefined herein to be restricted to any specific characteristics, features, or aspects of the present disclosure with which that terminology is associated. In general, the terms used in the following claims should not be construed to limit the present disclosure to the specific examples disclosed herein, unless the above Detailed Description explicitly defines such terms. Accordingly, the actual scope of the present disclosure encompasses not only the disclosed examples, but also all equivalent ways of practicing or implementing the disclosed technology under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the disclosed technology can be modified to employ the systems, functions, and concepts of the various references described above to provide yet further implementations of the disclosed technology.

To reduce the number of claims, certain implementations are presented below in certain claim forms, but the applicant contemplates various aspects of the disclosed technology in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method for managing alert communications with subscriber devices for a wireless telecommunication network, the method comprising:

predicting, by a messaging subsystem of the wireless telecommunication network, an occurrence of a network service change for a particular network subscriber based on a first event being published in a network event queue of the wireless telecommunication network, wherein the first event includes a unique identifier associated with the particular network subscriber, and wherein the first event indicates a failure by the particular network subscriber to satisfy one or more predefined service requirements associated with a network service of the wireless telecommunication network;

using the unique identifier associated with the particular network subscriber to identify, by the messaging subsystem, one or more subscriber devices associated with by the particular network subscriber;

transmitting, by the messaging subsystem, a first alert message to each of the one or more subscriber devices at a first timepoint prior to the predicted occurrence of the network service change, wherein the first alert message causes each of the one or more subscriber devices to locally generate and display a first visual notification of the first alert message, and wherein the first alert message has an active message type that causes the first visual notification to be persistently displayed by a given subscriber device irrespective of user input until a specific command from the messaging subsystem is received by the given subscriber device, detecting, by the messaging subsystem, a second event that is published in the network event queue at a second timepoint that is prior to the occurrence of the network service change and subsequent to the first timepoint, wherein the second event indicates that the network service change will occur within an upcoming time window; and in response to detecting the second event in the network event queue, transmitting, by the messaging subsystem, a second alert message to each of the one or more subscriber devices during the upcoming time window, wherein the second alert message causes each of the one or more subscriber devices to replace the first visual notification with a second visual notification of the second alert message, the second visual notification occupying a larger display area than the first visual notification.

2. The method of claim 1, wherein the second visual notification occupies a maximum display area available on a display screen of each of the one or more subscriber devices.

3. The method of claim 1, wherein the second alert message has a passive system type that enables the second visual notification to be dismissed by user input.

4. The method of claim 1, wherein at each subscriber device, the first visual notification and the second visual notification include deep links to one or more prevention operations within a local user application stored at the subscriber device, the one or more prevention operations being configured to prevent the occurrence of the network service change.

5. The method of claim 1, wherein the first alert message and the second alert message are transmitted to a system-level background client that is pre-loaded on each subscriber device, wherein the system-level background client is configured to maintain communication with the messaging subsystem of the wireless telecommunication network and to cause display of the first visual notification and the second visual notification.

6. The method of claim 1, wherein the unique identifier is an account identifier, and wherein the one or more subscriber devices are identified via a subscriber database that maps the account identifier to one or more mobile station international subscriber directory numbers (MSISDNs) corresponding to the one or more subscriber devices.

7. The method of claim 1, wherein the particular network subscriber is associated with a plurality of subscriber devices that includes a first subset of subscriber devices associated with a first permission level and a second subset of subscriber devices associated with a second permission level, and wherein the one or more subscriber devices each belong to the first subset of subscriber devices.

8. The method of claim 1, further comprising:

selecting, by the messaging subsystem, a particular prevention operation for the particular network subscriber via a machine learning model that is trained to select the particular prevention operation based on predicting a likelihood that the first event will reoccur, wherein the particular prevention operation is configured to, in response to user initiation, prevent the occurrence of the network service change; and including the particular prevention operation in the first alert message and the second alert message.

9. A notification system for a wireless telecommunication network, the notification system comprising:

at least one hardware processor; and at least one non-transitory memory, coupled to the at least one hardware processor and storing instructions that, when executed by the at least one hardware processor, cause the notification system to:

detect events published in a network event queue, wherein the events published in the network event queue indicate future occurrences of network service changes for network subscribers of the wireless telecommunication network;

in response to detecting a first event indicating a first length of time before a network service change for a particular network subscriber, transmit a first alert message to one or more subscriber devices associated with the particular network subscriber, wherein the first alert message causes each of the one or more subscriber devices to locally generate and display a first visual notification of the first alert message persistently irrespective of user input until a specific command is transmitted to each subscriber device; and in response to detecting a second event indicating a second length of time before the network service change for the particular network subscriber, transmit a second alert message to the one or more subscriber devices, wherein the second event is only detected if the first event was previously detected and the second length of time is shorter than the first length of time, wherein the second alert message causes each subscriber devices to replace the first visual notification with a second visual notification of the second alert message, the second visual notification occupying a larger display area than the first visual notification, and wherein the second visual notification includes the second length of time.

10. The notification system of claim 9, wherein the instructions further cause the notification system to:

receive a request from a given subscriber device in response to the first alert message, wherein the request indicates a prevention operation that prevents the network service change for the particular network subscriber;

cause the prevention operation to be executed by the wireless telecommunication network; and in response to detecting a third event that indicates a completion of the prevention operation, transmit the specific command to each subscriber device to dismiss the first alert message.

11. The notification system of claim 9, wherein the instructions further cause the notification system to:

identify the one or more subscriber devices associated with the particular network subscriber via a unique subscriber identifier included in the first event, wherein the unique subscriber identifier is mapped to one or more MSISDNs corresponding to the one or more subscriber devices.

12. The notification system of claim 9, wherein at a given subscriber device, the first visual notification and the second visual notification include deep links to one or more prevention operations within a local user application stored on the given subscriber device, the one or more prevention operations being configured to prevent the network service change for the particular network subscriber.

13. The notification system of claim 9, wherein the first alert message and the second alert message are transmitted to a system-level background client that is pre-loaded on each subscriber device that belongs to the wireless telecommunication network.

14. The notification system of claim 9, wherein the instructions further cause the notification system to:

select a particular prevention operation for the particular network subscriber via a machine learning model that is trained to select the particular prevention operation based on predicting a likelihood that the first event will reoccur based on subscriber-specific data; and including the particular prevention operation in the first alert message and the second alert message.

15. At least one non-transitory computer readable storage medium storing instructions that, when executed at least one data processor of a system, cause the system to:

identify an occurrence of a network service change for a particular network subscriber of a wireless telecommunication network via a network event queue of the wireless telecommunication network;

identify a plurality of subscriber devices associated with the particular network subscriber;

at a first timepoint prior to the occurrence of the network service change: transmit a first command to each subscriber device associated with the particular network subscriber, the first command causing each subscriber device to persistently display a first visual notification of the occurrence of the network service change until a specific command is transmitted to each subscriber device; and at a second timepoint prior to the occurrence of the network service change and subsequent to the first timepoint: transmit a second command to each subscriber device associated with the particular network subscriber, the second command causing each subscriber device to replace the first visual notification with a second visual notification that occupies a maximum display area available on each subscriber device;

wherein the first visual notification and the second visual notification include a deep link to a portion of an application locally stored on each subscriber device, the portion of the application enabling a user of a subscriber device to initiate a prevention operation to prevent the occurrence of the network service change.

16. The at least one non-transitory computer readable storage medium of claim 15, wherein the first timepoint and the second timepoint are defined by respective events that are published in the network event queue.

17. The at least one non-transitory computer readable storage medium of claim 15, wherein each subscriber devices that belongs to the wireless telecommunication network is pre-loaded with a remote notification background process, and wherein the first command and the second command are addressed to the remote notification background process of each subscriber device.

18. The at least one non-transitory computer readable storage medium of claim 15, wherein the instructions further cause the system to:

subsequent to the first timepoint and prior to the second timepoint: determine that the occurrence of the network service change for the particular network subscriber has been prevented; and transmit the specific command to each subscriber device to cause the first visual notification to be dismissed.

19. The at least one non-transitory computer readable storage medium of claim 15, wherein the instructions further cause the system to:

select a particular prevention operation for the particular network subscriber via a machine learning model that is trained to select the particular prevention operation according to subscriber-specific data for the particular network subscriber, wherein the first visual notification and the second visual notification are configured to indicate the particular prevention operation.

20. The at least one non-transitory computer readable storage medium of claim 15, wherein the plurality of subscriber devices are identified based on a unique identifier for the particular network subscriber being mapped to a plurality of MSISDNs corresponding to the plurality of subscriber devices.

* * * * *